(No Model.)

E. A. STEARS.
CULINARY VESSEL.

No. 557,288. Patented Mar. 31, 1896.

WITNESSES:
John Becker
S. M. Randall

INVENTOR,
Emily A. Stears
BY
John W. Kowalinka
ATTORNEY.

UNITED STATES PATENT OFFICE.

EMILY A. STEARS, OF BROOKLYN, NEW YORK.

CULINARY VESSEL.

SPECIFICATION forming part of Letters Patent No. 557,288, dated March 31, 1896.

Application filed July 7, 1892. Serial No. 439,238. (No model.)

*To all whom it may concern:*

Be it known that I, EMILY A. STEARS, of the city of Brooklyn, county of Kings, and State of New York, have invented a certain new and useful Improvement in Culinary Vessels, of which the following is a specification.

My invention relates to vessels for cooking various kinds of food, and is an improvement upon United States Letters Patent No. 273,629, dated March 6, 1883, and United States Letters Patent No. 308,004, dated November 11, 1884, granted to me for culinary vessels, in which the vessels are provided with a flue for returning to the fire the vapors and odorous gases generated in cooking.

This invention relates to culinary vessels provided with a flue for discharging into the stove the vapors generated therein; and it consists in the construction and combination of parts hereinafter particularly set forth and claimed.

Figure 1:
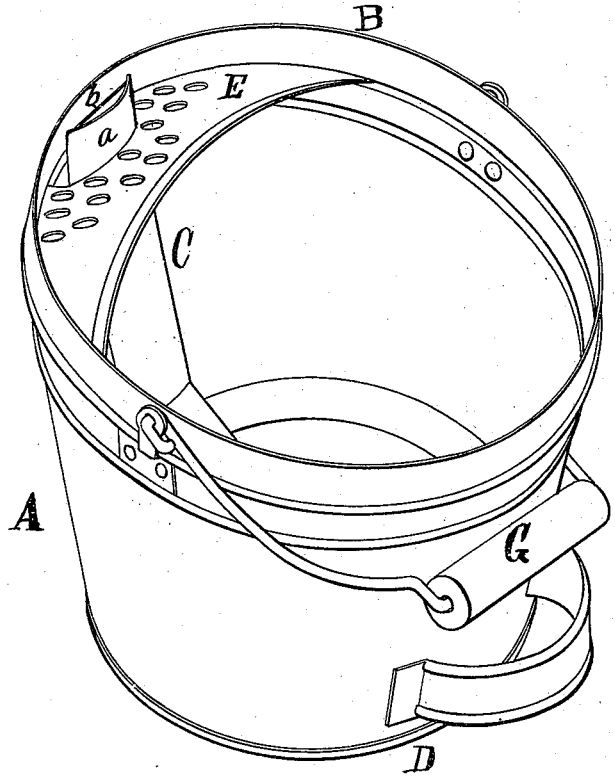
Figure 2:
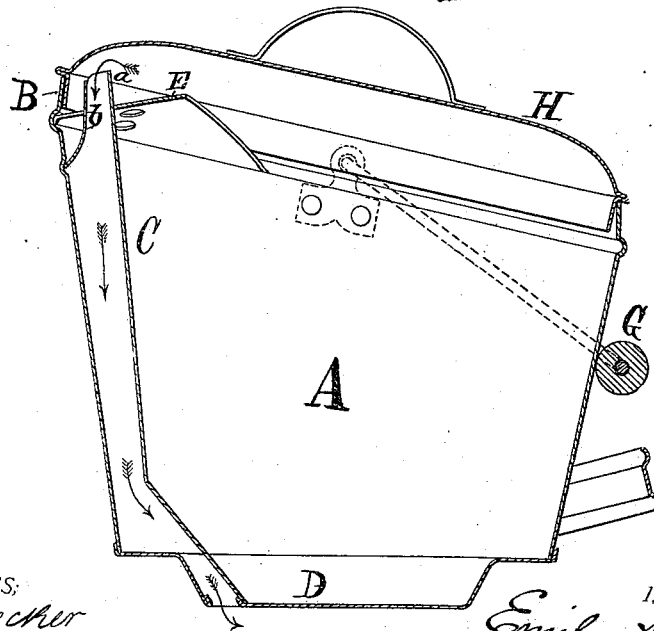

In the accompanying drawings, Figure 1 represents a perspective view of my improved culinary vessel. Fig. 2 represents a vertical section of the same.

In the accompanying drawings similar letters of reference designate corresponding parts in both figures.

A designates the body of a vessel made of cylindrical or other suitable form, of any suitable material, having its portion B inclined upward from one side.

C designates a flue extending through the bottom D of the vessel upward along one side of the body A at or near the top of the highest portion thereof. The upper portion $a$ of this flue C is preferably extended inward from the side of the highest portion of the vessel at the top, so as to permit of the flanged lid-cover H being placed around the same in covering the body of the vessel. One side $b$ of the upper portion $a$ of the flue C, extended inward, is preferably made somewhat lower than the remaining portion thereof, thus obviating any possibility of the water or other liquid contained in the vessel passing down into the flue and over the floor or stove when the vessel is tilted for the purpose of straining or pouring off the liquid contained therein. A strainer E may also be secured to the inside of a portion of the top of the vessel, so that when desired the food may be strained of the liquid or water contained therein by tilting the vessel. A suitable handle or bail G may be secured to the vessel in any ordinary manner. My improved construction of culinary vessels will be found also well adapted for use in a skillet or frying-pan, from which not only the odors are objectionable but also the scattering of particles of grease.

It will readily be seen that by the principle of my invention when the lid is put upon the inclined portion of the vessel any vapors or objectionable odorous gases generated in cooking will be compressed and made to ascend to the highest portion of the top of the body, from whence they will descend through the flue into the fire beneath the bottom of the vessel and be consumed instead of being allowed to escape into the room or apartment in which the cooking is done. It will also be seen that by the use of the flanged lid-cover the generated steam and vapors cannot pass out around or between the cover and the vessel, but on the other hand the flanged portion of the lid serves to withhold the same within the vessel.

What I claim as new, and desire to secure by Letters Patent, is—

In a culinary vessel the combination with the body having an inclined top, of a flue C secured thereto leading from or through the bottom of the vessel upward to or near the highest portion B of the inclined top, and having one side $b$ of the upper portion $a$ of the flue C which is extended inward from the side of the vessel, somewhat lower than the remaining portion thereof the higher portion being imperforate to prevent the liquid contained in the vessel from passing down the flue when the vessel is tilted, substantially as described.

EMILY A. STEARS.

Witnesses:
S. M. RANDALL,
HENRY MCCLOSKEY.